US006896462B2

(12) United States Patent
Stevenson et al.

(10) Patent No.: US 6,896,462 B2
(45) Date of Patent: May 24, 2005

(54) MECHANICAL AND ADHESIVE FASTENER UNIT

(75) Inventors: Robin Stevenson, Bloomfield, MI (US); Pei-Chung Wang, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/664,325

(22) Filed: Sep. 17, 2003

(65) Prior Publication Data

US 2005/0058521 A1 Mar. 17, 2005

(51) Int. Cl.[7] .............................................. F16B 39/02
(52) U.S. Cl. ...................... 411/82; 411/258; 411/387.1; 411/1; 411/9
(58) Field of Search ..................... 411/82–82.3, 258, 411/930, 1, 8–11, 386–387.8

(56) References Cited

U.S. PATENT DOCUMENTS

| | | | | |
|---|---|---|---|---|
| 2,092,341 A | * | 9/1937 | De Vries | ..................... 52/704 |
| 3,434,743 A | * | 3/1969 | Boeker | ......................... 285/39 |
| 3,472,301 A | | 10/1969 | Pearce, Jr. | |
| 3,772,957 A | | 11/1973 | Newton | |
| 3,907,442 A | * | 9/1975 | Reid | ............................ 403/37 |
| 4,648,753 A | * | 3/1987 | Stephan | ................... 405/259.5 |
| 5,088,866 A | * | 2/1992 | Ischebeck et al. | ............ 411/10 |
| 5,249,899 A | * | 10/1993 | Wilson | ........................ 411/82 |
| 5,452,977 A | | 9/1995 | Terrizzi | |
| 6,457,910 B1 | * | 10/2002 | Ludwig et al. | .......... 405/259.1 |

* cited by examiner

Primary Examiner—Flemming Saether
(74) Attorney, Agent, or Firm—Kathryn A. Marra

(57) ABSTRACT

A multi-part, self-drilling, self-tapping fastener with on board, internal chambered adhesive for, permanently connecting a plurality of parts at an overlaid joint thereof having access from one side. The fastener, that drills its own hole through the joint and taps its own threads for mechanically connecting the parts and subsequently extrudes the adhesive under pressure for optimized joint adhesive infiltration and bonding area for maximizing joint strength. The mechanical fastener holds the parts together eliminating the requirement for holding with auxiliary fixtures allowing the parts to be finished and painted during adhesive cure.

8 Claims, 3 Drawing Sheets

MECHANICAL AND ADHESIVE FASTENER UNIT

TECHNICAL FIELD

This invention relates to fastener units for joining parts and more particularly to a new and improved multi-component mechanical and adhesive fastener unit with on-board adhesive sealed for high pressure injection to optimize the mechanical connection and adhesive bonding of discrete parts.

BACKGROUND OF THE INVENTION

Prior to the present invention various mechanical and adhesive fastener units have been provided to mechanically and adhesively connect parts together. For example in U.S. Pat. No. 3,772,957 issued Nov. 20, 1973 to Albert E Newton for Self-Drilling and Sealing Rivet, the anvil of a blind rivet is provided with a forward drilling head so that it can bore a cylindrical opening for the rivet into parts being joined. This rivet is configured to distribute on-board adhesive into the joint of the parts when the anvil is set so that the parts are mechanically connected and are bonded on adhesive cure. In the U.S. Pat. No. 5,452,977 issued Sep. 26, 1995 to A. S Terrizzi for Fastener System, the threaded shank of a fastener is peripherally channeled to contain separate components of a two-phase bonding material. These components are intermixed when the fastener is installed which bond the fastener to the part being connected. In U.S. Pat. No. 3,472,301 issued Oct. 14, 1969 to M. B Pearce for Self-Sealing Mechanical Fastener, a hex-headed fastener is disclosed which has an externally threaded shank with an axial cavity filled with a viscous sealant. The sealant is distributed into the threaded connection of the shank with an associated internally threaded member to inhibit leakage though the threaded connection.

While these patents disclose an assortment of fastener units that incorporate many commendable features to improve fastening they do not meet new and higher standards for optimized installation and performance for multi-mode mechanical and adhesive fasteners in securing overlapped parts together. The prior units do not disclose or suggest the new and improved torque controlling and adhesive sealing provision of the mechanical and adhesive fastener of this invention. More particularly the prior art does not measure up to the present invention that automatically seals and effectively distributes adhesive under high pressure loads into close fitting joint and interface areas of parts being joined for optimized part bonding as the threaded mechanical connection is being completed with optimized tension.

In further contrast to the prior art, this invention provides a new and improved self-drilling, self-tapping threaded fastener with installation torque automatically controlled by an intermediate sleeve to optimize the mechanical connection of separate parts. This connection is additionally enhanced by the subsequent controlled delivery of onboard adhesives and sealant into the threads of the interconnected members and to the interface of the discrete parts being connected.

SUMMARY OF THE INVENTION

One preferred embodiment of this invention is provided by a hollow self-drilling, self-tapping threaded fastener whose threaded fastening of multiple parts is augmented by bonding with an on-board adhesive and sealant included therewith. This unit comprises a primary connecting screw having an externally threaded shank having an internally threaded bore that adjustably supports a drive screw that threads therein. However, this drive screw is only partially threaded into the bore of the connecting screw and is supported in this position by a collapsible, adhesive-sealing, torque-transmitting annulus or collar operatively mounted between the aligned heads of the connection and drive screws. The cavity defined by the bore of the connection screw and the shank of the drive screw threaded therein contains an adhesive therein that under pressure loads, communicates with areas external to the connection screw via small diameter and radially extending passages formed in the shank thereof. This construction initially allows the drive screw to be torsionally driven to drive the connecting screw to fasten parts together and subsequently to effect the collapse or stroking of the collar so that the drive screw can be threadedly advanced into the cavity to approach the terminus of the bore to displace and squeeze the adhesive therein under high load through the radial passages and into interface areas of the parts to effect optimized adhesive bonding.

The invention features a single input drive with torque applied at different levels to initially effect bore drilling, mechanical threaded installation and subsequently adhesive distribution to optimize the connection of discrete parts. Accordingly this invention features a staged installation of the fastener in which the entire unit is threadedly advanced with application of a specified mechanical installation torque to an outer drive screw to achieve optimized mechanical fastening of the parts by an associated fastening screw. Subsequently when the fastening screw is firmly positioned, installation resistance increases and with continued installation torque, controlled stroke or collapse of the collar occurs to effect the application of the adhesive.

More particularly and desirably without interruption in this phase of installation, the outer driving screw is turned and advanced into the connecting screw to effect the high-pressure distribution of on-board adhesive into the joint of the connected parts. This application of torque to advance the drive screw relative to the connection screws completes the installation of the threaded fastener unit with a predetermined tension applied to the connection screw for optimized mechanical and adhesive fastening particularly with the improved distribution of adhesive to augment the mechanical connection.

With this invention the torque-transmitting collar importantly provides a full-time seal for the on-board adhesives and particularly under high-pressure conditions so that the adhesive will be effectively forced into tight interface areas of the joint.

These and other features objects and advantages will become more apparent from the drawings and detailed description and claims.

BRIEF DESCRIPTION OF THE DRAWINGS

FIG. 1a is a partly exploded pictorial view of the components of FIG. 1;

DESCRIPTION OF THE PREFERRED EMBODIMENTS

Figure 1:
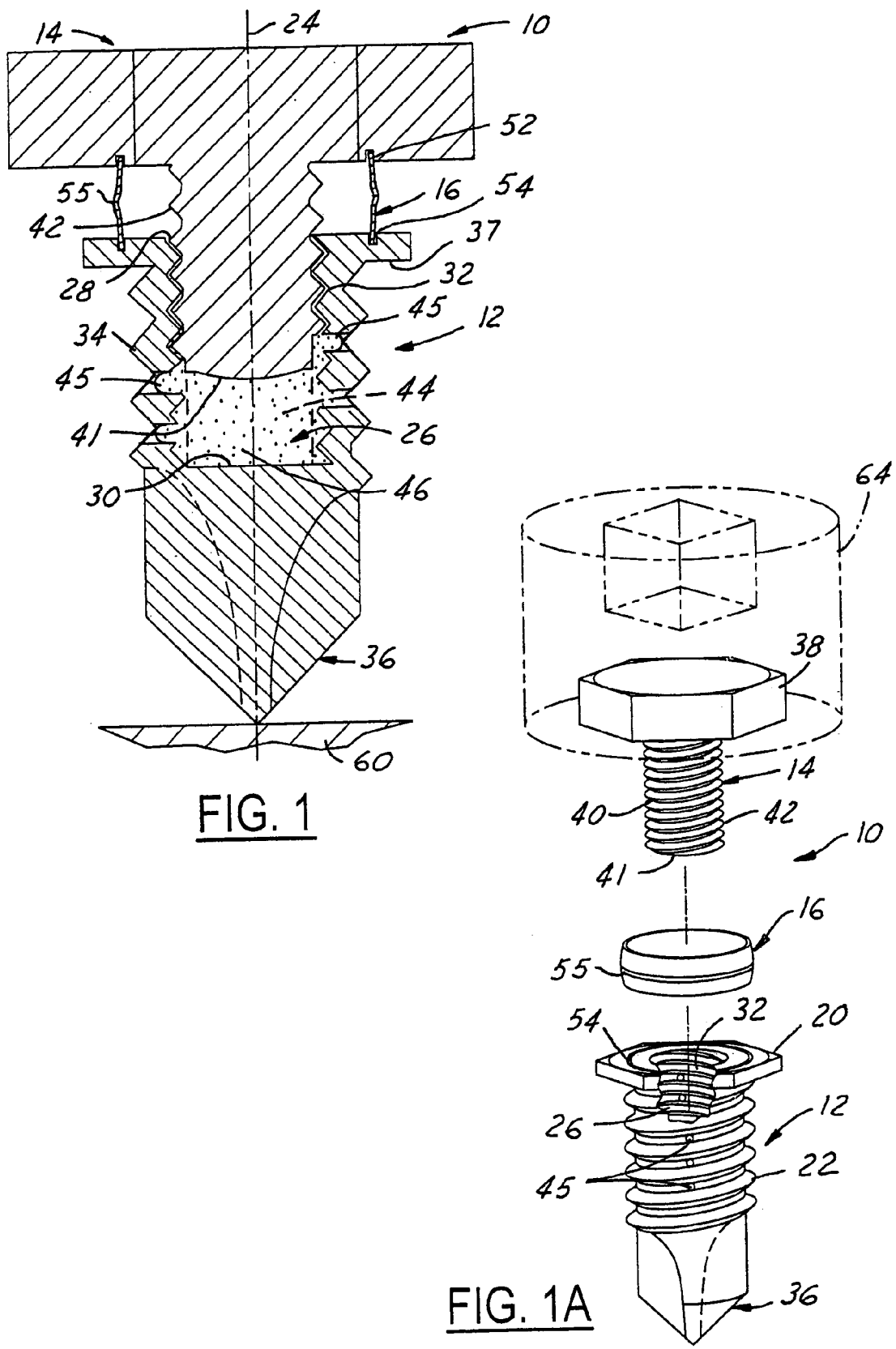
FIG. 1 is a sectional front view of an adhesive filled self-drilling and self-tapping threaded fastener illustrative of some components applicable to this invention.

Turning now in greater detail to the drawings, FIG. 1 illustrates one preferred embodiment of a mechanical and adhesive threaded fastener 10 according to this invention. This unit comprises a primary connection screw 12, a driving screw 14 and a torque-transmitting, intermediate sleeve or collar 16 operatively disposed between the driving screw and the primary connection screw 12. The connection screw is an elongated, shell-like member of steel having a flat or other suitably shaped upper head portion 20 and a depending shank portion 22 disposed about a central axis 24. The head and shank portion have an axially-extending bore 26 formed therein extending from an entrance 28 in the head portion to a transversely-extending bottom surface 30 in the shank. The cylindrical wall defining this bore is internally threaded with a helical thread 32 winding about the axis 24 and leading from the entrance opening in the head to the bottom surface 30. Additionally the cylindrical wall of the connection screw 12 has an external helical thread 34, which may be case hardened or otherwise optimized for tapping of an internal thread for improved mechanical connections of parts. This external tapping thread leads from a drilling bit 36 that may have flutes and forward cutting edges at the foremost end of the fastener unit 10. This helical thread 34 leads to the flat bottom or contact surface 37 of the head portion 20. The working diameter of the drill bit 36 is smaller than the diameter of the self tapping screw so that the self tapping screw thread 34 of the connection screw can cut a mating thread into the wall of the bore made by the drill bit for optimizing the mechanical connection of the parts being joined.

Figure 2:
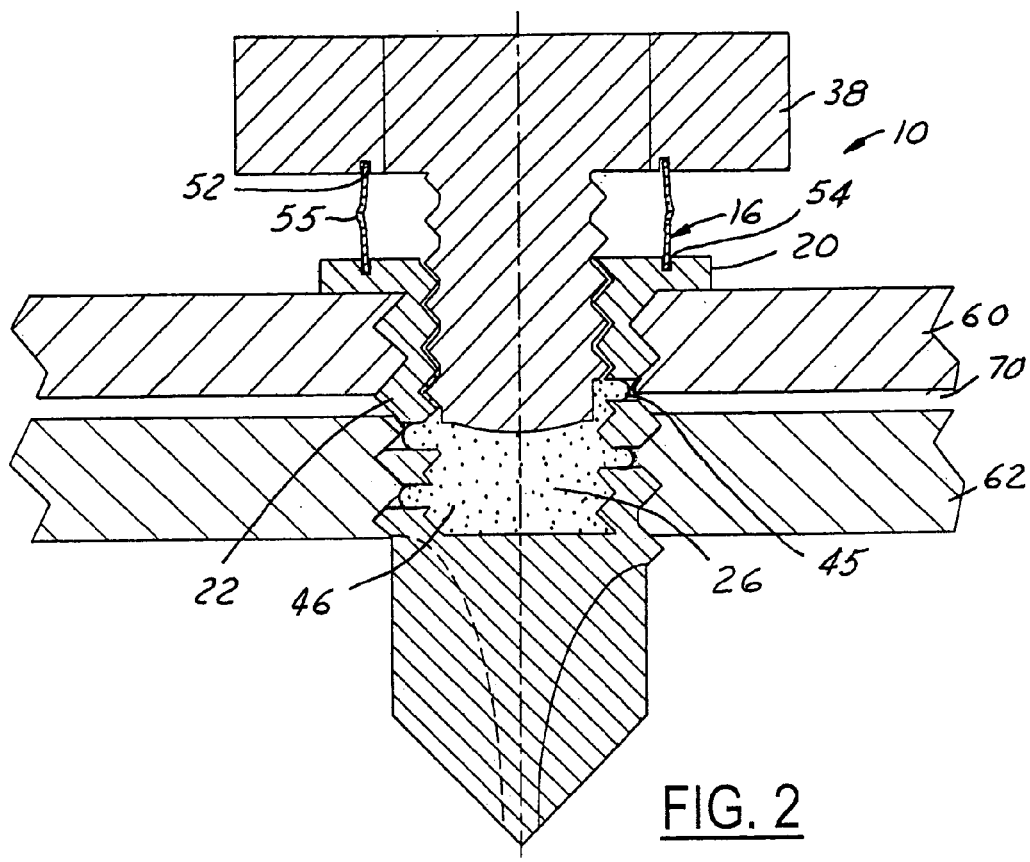
FIG. 2 is a sectional front view of the threaded fastener of FIG. 1 deployed in an intermediate stage of connection of two components to one another.
Figure 3:
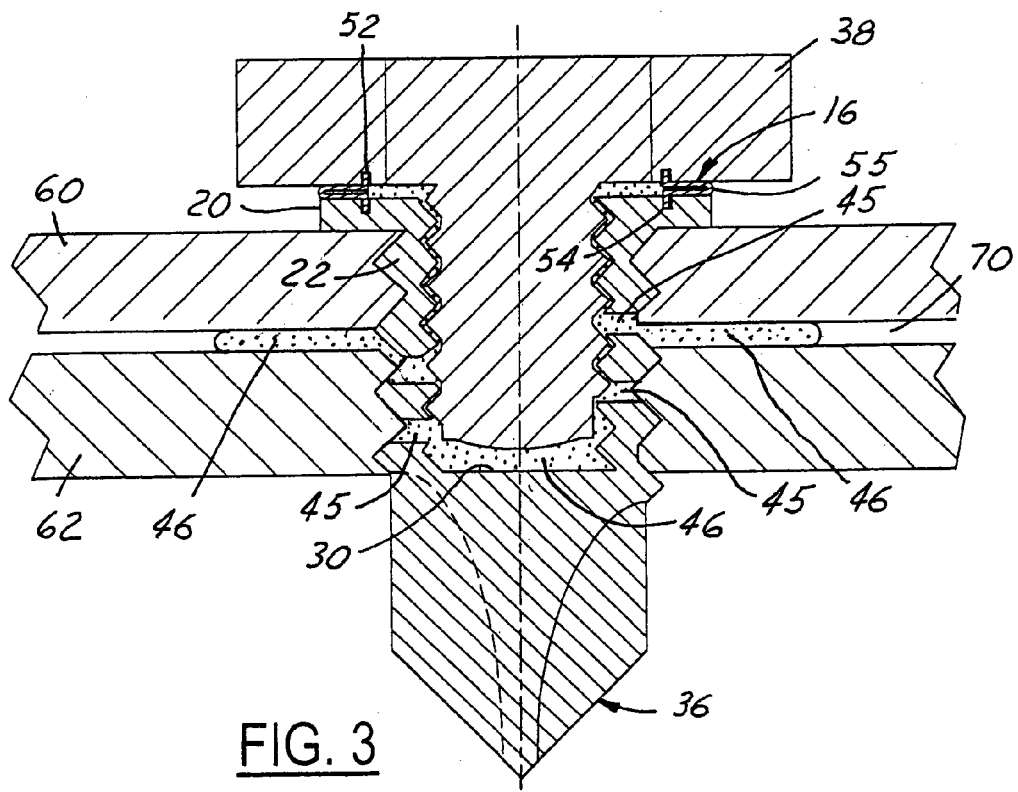
FIG. 3 is a sectional view similar to the views of FIGS. 1 and 2 showing the threaded fastener in a home position to adhesively and mechanically join components to one another.

The rotatable driving screw 14 is a steel member designed to thread into the primary connection screw 12 and comprises a polygonal head 38 and a depending solid shank portion 40 that terminates in a generally transverse lower end 41. A helical thread 42 is externally formed on the shank portion that leads from the lower end 41 to the head 38 and is adapted to threadedly mesh with the internal thread of the connection screw. With this threaded connection, the driving screw can be appropriately driven to advance or retract with respect to the threaded bore 26. As best illustrated in FIGS. 1–3, a variable volume chamber 44 is formed in the inboard end of the bore as defined by the cylindrical wall and bottom surface of the bore 26 and the cooperating, axially-displaceable lower end 41 of the shank. Small diameter radial passages or orifices 45 are laser drilled or otherwise formed at varying points through the cylindrical wall of the shank portion 22 of the connection screw to provide adhesive management and distribution passages for the fastener unit in accordance with this invention. The adhesive has a consistency, viscosity, and other properties such that it does not weep or otherwise leak through the passages 45 during storage and handling.

More particularly, the variable volume chamber 44 is supplied with a predetermined quantity of an adhesive 46 suitable for subsequent distribution to the exterior of the shank portion and the interface of parts being joined. This adhesive can be any suitable fastener adhesive including a two-part epoxy; a microencapsulated epoxy or other material suitable for bonding parts as is well known in this art.

Operatively disposed around the driving screw and between the heads of the drive and connection screws is the intermediate, torque-transmitting sleeve or collar 16. The sleeve may have a barrel shaped configuration and is made of brass or other suitable material. The annular ends of the sleeve fit into circular grooves 52 and 54 in opposing surfaces of the heads of the driving and connection screws. The diameter of the sleeve may progressively increase from opposite ends thereof until a maximum diameter is reached at a circular groove, bulged or weakened bend zone 55 approximately midway between the ends of the sleeve.

FIGS. 1a, 2 and 3 illustrate the self-tapping, mechanical and adhesive fastening operation of this invention in connecting two parts here exemplified as flat metal sheets 60 and 62. No fixtures are needed since the initial connection is quickly made by the loaded fastener unit. In one preferred mode of installation, a driver 64 or other tool is drivingly engaged with the hex head 38 of the driving screw 14, and appropriate thrust and torque installation forces are applied thereto. These forces are transmitted through the sleeve 16 to the connection screw 12, which turn about a drilling and installation axis, such as axis 24. This action serially bores aligned annular holes in the overlapped flat metal sheets 60, 62 being joined together to define an installation bore. As the turning main body of the connector screw advances into this bore under specified torque loads, the tapping thread cuts or otherwise forms a mating thread in the inner wall of the bore so that the two parts are mechanically connected by the connection screw. As the connection screw reaches a fully installed position, the contact surface 37 of the head of the connection screw is driven into the top sheet 60 of the workpieces. This engagement restrains further advance of the connection screw and draws the parts closely and tightly together at the interface thereof. Moreover this action results in the application of a significant increase in torque on the driving screw and increased vertical load on the intermediate sleeve. When this load reaches a predetermined and sufficiently high level, the tension on the connection screw is set for optimal mechanical fastening. The controlled stroke or buckling of the sleeve 16 subsequently occurs.

The sleeve 16 is of a suitable configuration or geometry so that it is set to buckle outwardly or otherwise compress and stroke without fracture for effective sealing of the adhesive within the joint. In any event, once buckling is initiated, the annulus continues to buckle outwardly allowing the internal or drive screw to advance into the adhesive reservoir or chamber 44. This loads and displaces the adhesive confined therein and squeezes it through the orifices or passages 45 in the connecting screw and forces it under high pressure loading into the meshing threads and into a large area of the interface 70 of the overlaid part. The wall of the sleeve may fold together as shown in FIG. 3 to prevent adhesive flow past the heads of the drive and connection screws. With the ends of the sleeve located in top and bottom grooves in the heads of the drive and connection screws the sealing of the buckled sleeve is optimized. In any event, the intermediate sleeve is active to ensure that the adhesive will be retained in the connector screw and allows very high loads to be imparted to the adhesive assuring that the adhesive will be forced into the intermeshing areas of the screws, the connection screw and workpiece and particularly into tight fitting interface 70 of the two parts being joined.

This is important in many instances since the large mechanical clamping force imposed by the connection screw could be such that adhesive flow into interface areas of mechanically connected parts is somewhat inhibited except under high pressure. In the absence of effective sealing for example, an adhesive leakage path past the hex head of the driving screw could minimize the application of such adhesive into the joint or interface. However, with the improved sealing and high-pressure adhesive distribution of this invention there is assurance that a wide-coverage layer of adhesive will be applied in the interface areas to produce higher joint strengths.

It will be understood from the above that this invention has provided a mechanical and adhesive fastener for improved connection of discrete components which features a torque transmitting and adhesive sealing sleeve that provides for multi stage fastener installation that may have a continuous rotational input drive. In a first discrete stage, a fastener hole is bored and the mechanically threaded connection is made with self-threading operations with fastener advancement. In a second stage of operation the sleeve forms into a flattened seal so that a high-pressure adhesive can be applied into the interface of the joint and into the meshing threads for optimized fastening without any supplemental clamping of parts together or other fixturing.

Figure 4:
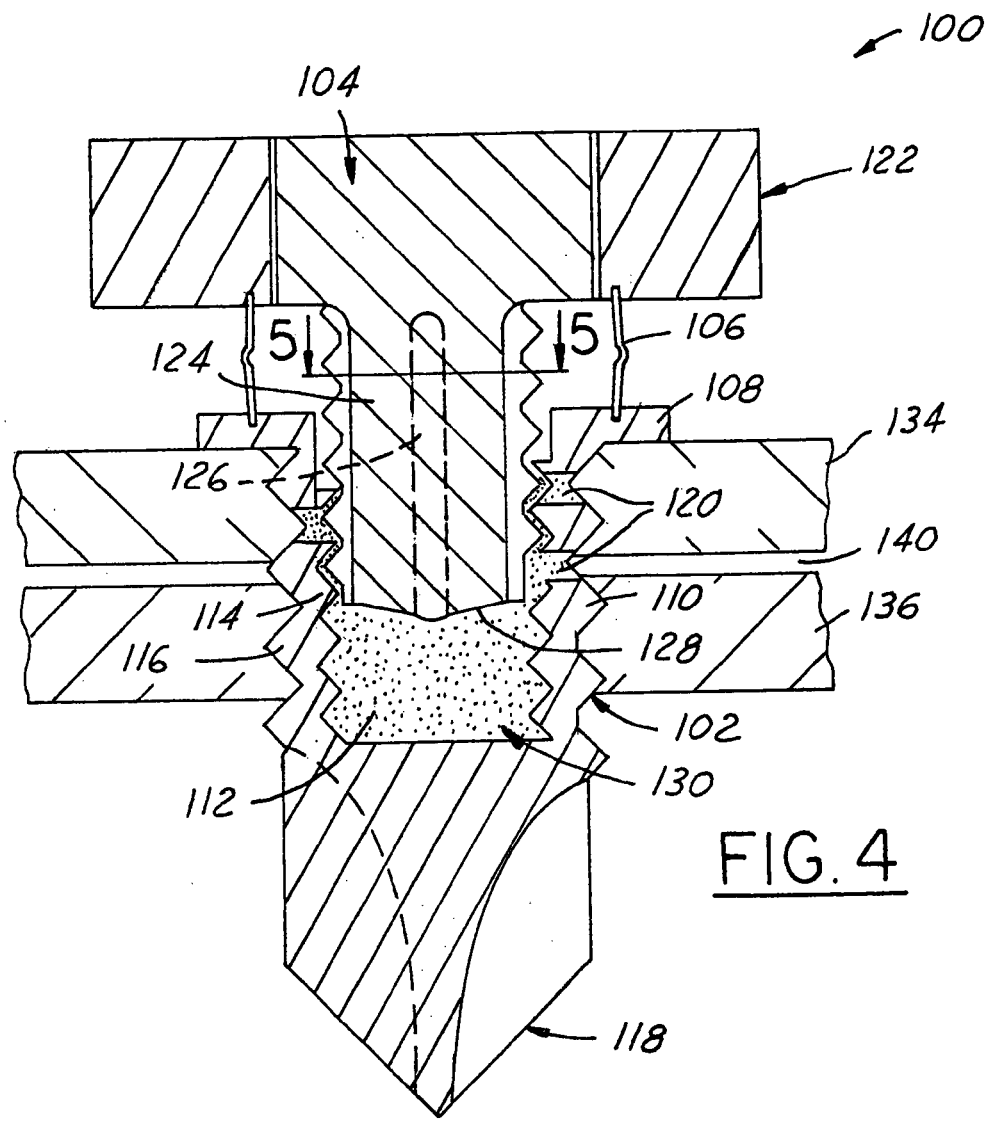
FIG. 4 is a sectional front view of another adhesive filled threaded fastener illustrating another embodiment of this invention
Figure 5:
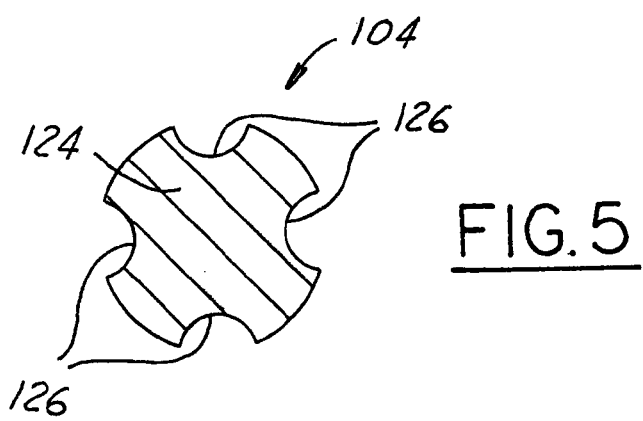
FIG. 5 is a cross sectional view of a portion of the embodiment of FIG. 5 taken along sight lines 5—5 thereof.

FIGS. 4 and 5 illustrate another embodiment of this invention similar in construction to the embodiment of FIGS. 1–3 in that the fastener unit 100 unit incorporates an adhesive-filled connection screw 102 internally threaded to receive a driving screw 104 with a torque transmitting intermediate sleeve 106 operatively mounted therebetween.

The connection screw has an upper head portion 108 and a depending centralized shank 110 formed within axially extending bore or chamber 112 therein. The wall of the bore has a helical thread 114 cut therein leading from the upper opening in the head portion 108 to accommodate the shank of the associated driving screw 104 as will be understood from the construction and description of the previous embodiment and from the drawings. In addition to being internally threaded, the shank is formed with a self tapping external thread 116 that leads from a drilling tip 118 fabricated as the forward end of the shank 110 to the flat bottom surface of the upper head portion. The shank has a number of radial passages or holes laser 120 drilled or otherwise formed therein which provide for the communication and adhesive transmittal from the chamber to the threaded exterior of the shank 110. These passages are strategically located in the upper reaches of the cylindrical wall of the shank 110 and have openings of selected diameter that may provide for optimized flow of adhesive into the threaded connection and the interface of two parts being joined together. It should be noted that the lower portions of the bore 112 are blanked so that adhesive cannot escape through the lower part of the connection screw and possibly bypass the interface of parts being joined.

The drive screw 104 has a polygonal shaped drive head 122 and a solid shank 124 depending therefrom which is externally threaded to operatively mesh with the internal thread of the shank of the connection screw. As illustrated in FIGS. 4 and 5 the shank 124 has a plurality of elongated, adhesive-conducting channels 126 provided in the periphery thereof. The channels 126 may be equally spaced from one another and extend from the distal end 128 of the shank to selected terminal points extending beyond the upper limits of the internal threads of the shank 110.

The torque transmitting intermediate sleeve 106 is preferably end-mounted in annular grooves in the facing surfaces of the heads of the driving and connection screws for adhesive sealing as in the first embodiment and operation in the same manner as previously described. A selected quantity of adhesive 130 is supplied into the bore 112 and the drive screw and torque transmitting screw sleeve are assembled to the connecting screw as illustrated in FIG. 4.

For connecting overlapping parts 134 and 136, the fastener unit 100 is rotatably driven and axially loaded to drill a bore in the overlapping parts. When the connection screw is driven home and can no longer advance, the sleeve 106 will collapse and provide sealing as described and the drive screw threads into the connection screw to displace adhesive in the chamber 112. This action forces the adhesive 130 from the progressively diminishing chamber upwardly into the vertical channels 126 and into the threaded connection between the drive and connection screws and importantly through the upper passages 120 in the shank of the connecting screw. With these upper passages providing the optimized escape route for the adhesive, the adhesive will be fed into the interface areas 140 of the parts being joined.

While the invention has been shown and described with reference to preferred embodiments and operations, it will be understood and appreciated that those skilled in the art are enabled to make various modifications and alternative to that which has been shown and described without departing from the scope and spirit of the invention.

What is claimed is:

1. A mechanical and adhesive fastener for joining parts at an interface, the fastener comprising:

a connecting member having a connecting member head portion and a depending connecting member shank portion with a terminal end disposed about a centralized axis, said connecting member head and shank portions having a bore therein defined by an inner wall centered about said axis and an internal bottom surface in said connecting member shank portion, said bore extending from said bottom surface through said connecting member head portion, said inner wall having an internal helical thread winding about said axis, said connecting member shank portion having an external thread thereon for the threaded connection with at least one of the parts being joined, a driving member having a driving member head and a threaded driving member shank, said threaded driving member shank being threadedly connected with said internal helical thread of said connecting member shank portion and advanced therein to a point spaced from said bottom surface of said bore to thereby define a variable volume cavity in said connecting member shank portion, an adhesive disposed in said cavity, adhesive conducting passages leading from said cavity to the exterior of the shank portion of said connecting member, and a torque transmitting intermediate sleeve operatively mounted between the driving member head and the connecting member head portion for transmitting predetermined torque loads for driving said connecting member into at least one of said parts to thereby mechanically connect said parts together and then for collapsing to provide an adhesive seal between said connecting member head portion and said driving member head and to allow said driving member shank to enter said cavity to a position therein to thereby force said adhesive into said interface of said parts to adhesively connect said parts.

2. A mechanical and adhesive self-drilling and self-tapping threaded fastener for connecting parts at a common joint, the threaded fastener comprising:

an outer shell member having an upper shell member head portion and a depending shell member shank portion, said shell member head and shank portions being hollow to define an inner axially-extending cavity terminating in a bottom surface in said shell member shank portion, an internal helical thread within said shell member shank portion winding about said inner cavity, said shell member shank portion extending from integration with said shell member head portion to a terminal end portion, said terminal end portion being formed with forward cutting edges to constitute a drilling bit, said shell member shank portion further having an external helical thread leading from said drilling bit to said shell member head portion, a driving member having an upper driving member head and a driving member shank operative to be threaded into the hollow shank portion of said outer shell member to a point spaced from said bottom surface of said cavity, an adhesive disposed in said cavity, and a generally cylindrical collar operatively mounted between said driving member head and said shell member head portion operative to transmit torque imparted to said driving member to said outer shell member initially to drivingly join said parts for rotation together and subsequently to compress and allow the continued application of torque to said driving member so that it advances into said cavity and displaces said adhesive therein to thereby force quantities of said adhesive into said common joint between the parts being connected.

3. The fastener unit of claim 2 wherein said external helical thread of said shell member shank portion is self tapping and is operable to tap threads into said parts being connected and wherein said shell member shank portion has adhesive conduction passages formed therein for transmitting adhesive from said cavity to said common joint of the connected workpieces.

4. A threaded mechanical and adhesive fastener for securing discrete parts overlaid at a common interface, the fastener comprising:

a connection screw, a driving screw and an intermediate torque transmitting sleeve operatively mounted between said connection and driving screws, said connection screw having an upper connection screw head portion and an elongated connection screw shank portion depending therefrom and disposed about a central axis, said connection screw head and shank portions having an elongated bore therein extending about said axis and from an entrance in said connection screw head portion to a bottom surface in said connection screw shank portion, said connection screw shank portion being internally and externally threaded, and having adhesive conducting passages formed in said connection screw shank portion connecting said bore to the external thread of said connection screw shank portion, said driving screw having a driving screw head and a driving screw shank extending therefrom, said driving screw shank being externally threaded to threadedly engage the internal threads of said connection screw and to cooperate with said bore to define a variable volume adhesive chamber, an adhesive in said chamber, and a torque transmitting sleeve for limiting installation torque applied to said driving screw and to seal the drive screw relative to the connection screw and to effect the controlled pressure application of adhesive into said common interface.

5. The fastener of claim 4 wherein said shank of said connection screw has a drill formed as the leading end thereof for drilling a bore in said discrete parts and wherein the external thread on said shank portion of said connecting screw is a self tapping thread spiraling externally therearound so that the connection screw can be rotatably driven to drill a mounting bore through said parts and subsequently tap a thread in said bore so that said threaded fastener threadedly connects said parts and said driving screw subsequently effects the grounding of said connection screw and advances into said adhesive chamber to force said adhesive therefrom at high pressure into said interface to effect the adhesive bonding of said joint.

6. The fastener of claim 4 wherein said torque-transmitting sleeve is a generally cylindrical and collapsible member operatively disposed about said driving screw for transmitting torque to said connection screw while sealing said chamber to optimize the threaded and adhesive connection.

7. A threaded mechanical and adhesive fastener for securing discrete parts overlaid at a common interface, the fastener comprising:

a connection screw, a driving screw and an intermediate torque transmitting sleeve operatively mounted between said connection and driving screws, said connection screw having an upper head portion and an elongated shank portion depending therefrom and disposed about a central axis, said head and shank portion having an elongated bore therein extending about said axis and from an entrance in said head portion to a bottom surface in said shank portion, said shank portion being internally and externally threaded, adhesive conducting passages radially formed only in an upper portion of said shank portion connecting said bore to the external thread of said shank portion, said driving screw having a driving head and a shank extending therefrom, said shank being externally threaded to threadedly engage the internal threads of said connection screw and to cooperate with said bore to define a variable volume adhesive chamber, said shank having at least one elongated adhesive conducting channel therein, an adhesive in said chamber, and said torque transmitting sleeve being adapted for limiting installation torque applied to said driving screw and to seal the drive screw relative to the connection screw and to effect the controlled pressure application of adhesive through said adhesive conducting channel into said common interface.

8. The fastener of claim 7 wherein said shank of said connection screw has a drill formed as the leading end thereof for drilling a bore in said discrete parts and wherein the external thread on said shank portion of said connecting screw is a self tapping thread spiraling externally therearound so that the connection screw can be rotatably driven to drill a mounting bore through said parts and subsequently tap a thread in said bore so that said threaded fastener threadedly connects said parts and said driving screw subsequently effects the grounding of aid connection screw and advances into said adhesive chamber to force said adhesive therefrom at high pressure into said interface to effect the adhesive bonding of said joint.

\* \* \* \* \*